Aug. 16, 1927.     H. N. ATWOOD     1,638,818
METHOD OF FORMING SUBMARINE HULLS
Filed Aug. 23, 1923     2 Sheets-Sheet 1
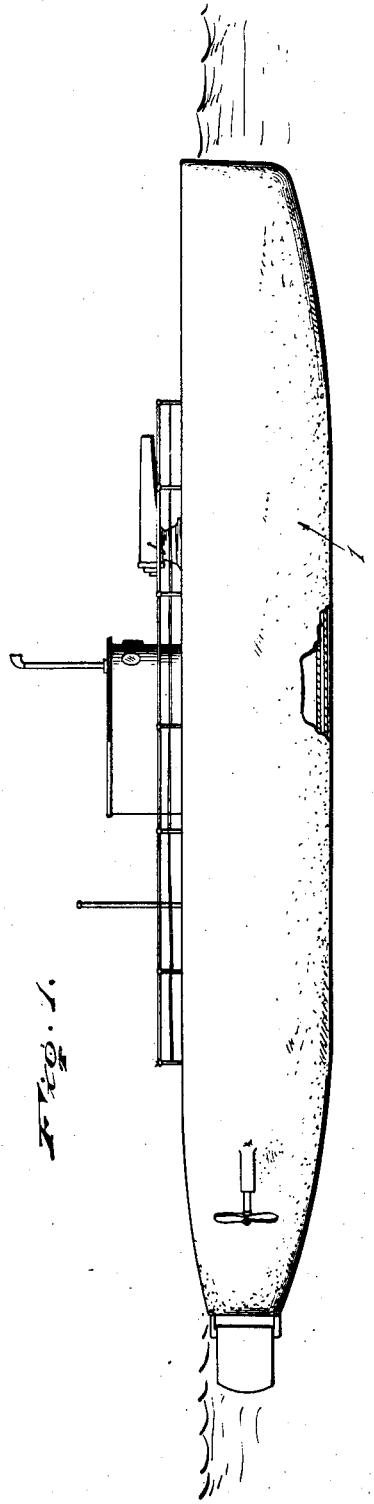
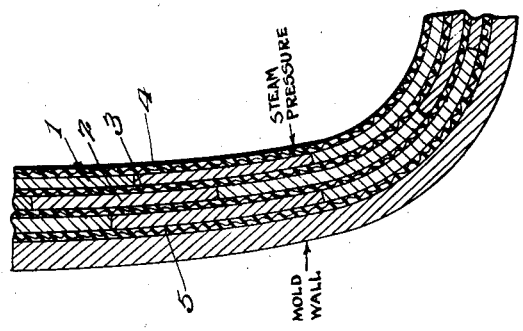
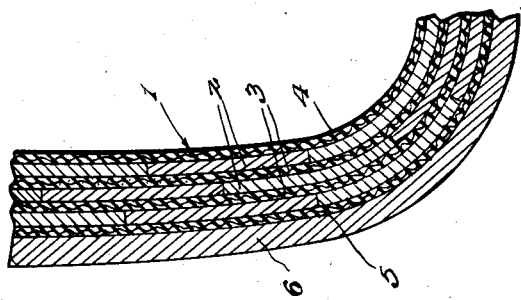
Inventor
Harry N. Atwood.
By
Lacey & Lacey, Attorneys Aug. 16, 1927.

H. N. ATWOOD 1,638,818

METHOD OF FORMING SUBMARINE HULLS

Filed Aug. 23, 1923   2 Sheets-Sheet 2

Inventor

Harry N. Atwood.

By Lacey & Lacey, Attorneys

Patented Aug. 16, 1927.

1,638,818

UNITED STATES PATENT OFFICE.

HARRY N. ATWOOD, OF MONSON, MASSACHUSETTS, ASSIGNOR TO RUBWOOD, INC., OF LAWRENCE, MASSACHUSETTS, A CORPORATION OF MASSACHUSETTS.

METHOD OF FORMING SUBMARINE HULLS.

Application filed August 23, 1923. Serial No. 658,950.

This invention relates to a novel method of constructing the hulls of submarine and similar marine craft, and the construction of which hull is clearly disclosed in my co-pending application for patent for submarine craft, filed Aug. 23, 1923, Serial No. 658,949.

The hull constructed in accordance with the present method and as disclosed in my aforesaid co-pending application, consists, briefly stated, of a number of plies of veneer or other similar material which are alternately arranged with plies of rubber material and intimately bonded thereby, the structure being substantially integral throughout and being provided with a lining upon its interior of rubber material and a facing, upon its exterior, of similar material. In order that the several plies constituting the hull may become intimately bonded and preferably united to one another to produce the integral structure, the plies, after suitable assemblage, are subjected to vulcanization and these several steps are carried out in the specific manner which will hereinafter be pointed out.

In the accompanying drawings:

Figure 1 is a side elevation of a submarine constructed in accordance with the method of the present invention;

Figure 3 is a sectional view illustrating the plies assembled and the assemblage arranged within a mold in which the vulcanizing step is to be carried out;

Figure 4 is a similar view illustrating the manner of carrying out the step of vulcanization.

Figure 2:
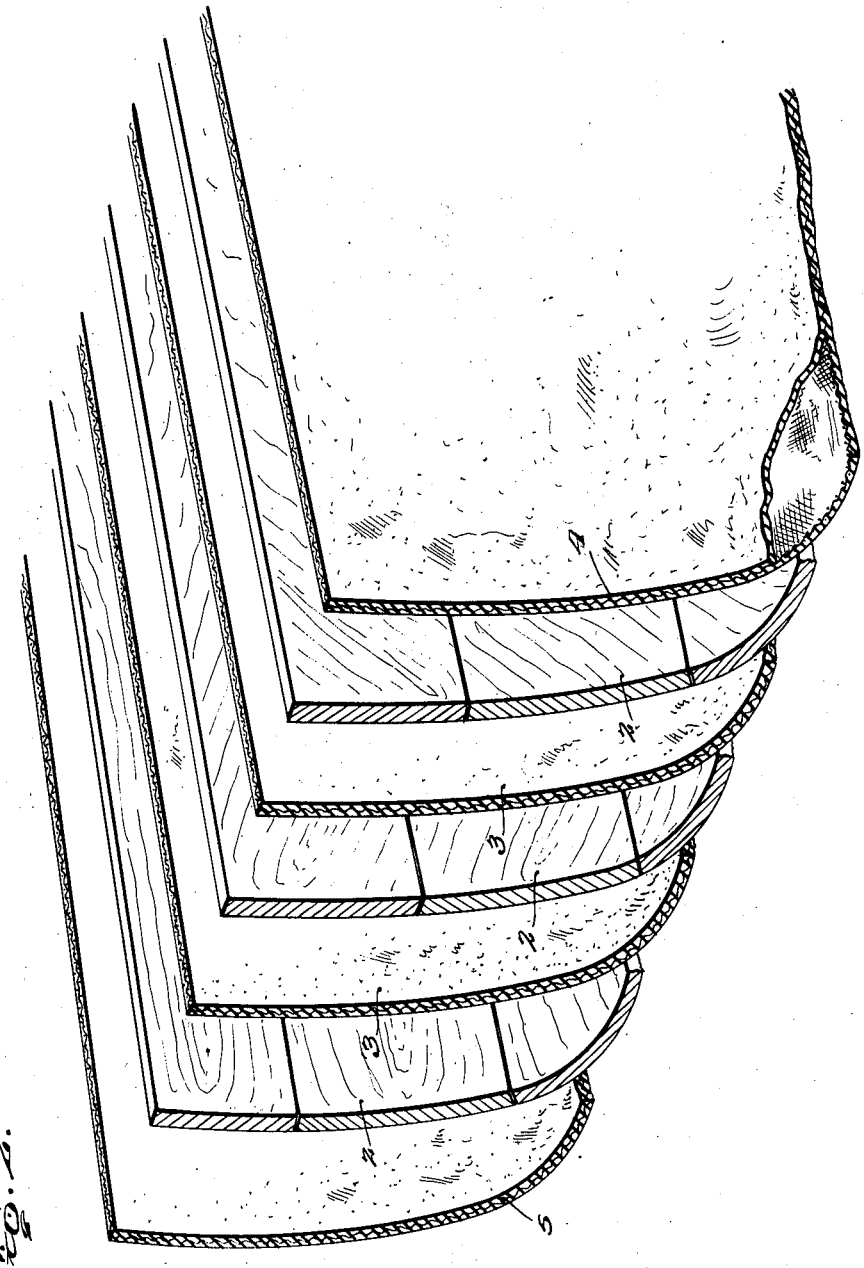
Figure 2 is a fragmentary sectional perspective view illustrating the manner in which the several component plies of the wall of the hull are arranged prior to assemblage.

In the drawings the hull of the submarine is indicated in general by the numeral 1 and the wall of the hull is made up of an assemblage of plies intimately bonded together to form an integral and composite structure. Certain of the plies, indicated by the numeral 2, are of veneer or other similar material. These plies are alternated with other plies 3 of rubber, rubberized fabric, or other rubber material which may be found suitable for the purpose. A lining ply 4 of similar rubber material covers the inner surface of the hull, and a facing ply 5 likewise of similar rubber material, covers the exterior of the hull. This, in general, constitutes the structure of the wall of the hull and said wall is substantially integral throughout, there being preferably no seams, joints, or places of division between the several component portions of the hull.

In carrying out the method of the present invention, the several plies above described are arranged in the manner shown in Figure 2 of the drawings, they having been previously shaped to the required contour, and the assemblage is then placed within a mold which is indicated in the drawings in general by the numeral 6. It will be understood at this point that the various plies may be assembled by laying them in place one upon another within the interior of the mold, the plies having been, as previously stated, shaped to the required contour. The mold may be of any desired construction and as this does not enter into the present invention in a material aspect, the mold wall has been illustrated more or less diagrammatically, it being understood of course that this wall is a rigid structure and conforms, interiorly, to the general shape of the entire hull of the submarine or other craft. When the various plies have been assembled, or the assemblage has been built up within the mold in the manner explained, the entire structure is preferably substantially hermetically sealed by closing all hatch and similar openings therein in a steam tight manner, and steam under high pressure is then admitted into the assemblage comprising the hull and by reason of its expansive force, will exert great pressure against the plies thereby compressing them against the wall of the mold as indicated in Figure 4 of the drawings. During this step of the method, the rubber content of the plies 3, 4 and 5 is vulcanized, and the entire number of plies comprising the assemblage are intimately and permanently bonded together. The steam pressure is of course maintained until the heat from the steam has thoroughly vulcanized the assemblage of plies, and after the process of vulcanization is complete, the hull, then in the form of an integral body, is removed from the mold, and is then ready to be equipped with hatches, the super-structure, and such other parts as it is necessary to install.

In assembling the various plies comprising the wall of the hull, care is taken to avoid any seams or other discontinuities, the plies being so arranged that where the edges of two veneer plies, for example, are located, the joints will be overlapped by an unbroken ply, on each face, of the rubber material constituting either the bonding plies or the facing or lining plies. Also care is taken to so arrange the veneer plies that in adjacent layers they will break joint, thus providing against any weak places in the wall of the hull which might impair the strength of the hull when subjected to compressive forces and strains.

While the physical characteristics and qualities of the structure are remarkable, they have been fully set forth in my copending application and therefore in this case it is only necessary to say that the structure is one possessing a desirable degree of resiliency, flexibility, and yieldability, is water-proof, capable of absorbing shocks and impacts and of withstanding severe compressive forces and strains, and heat and sound insulating.

Having thus described the invention, what is claimed as new is:

The method of producing a composite marine craft hull which comprises providing a hollow mold of an internal contour conforming to the external contour of the hull placing alternate layers of rubber and thin wood within the mold, the first and last layers being rubber and the wooden layers being shaped to conform to contour of the hull, closing the mold, introducing steam to vulcanize the rubber and effect union thereof with the wooden layers and form a hull of a unitary construction, and bodily remove the hull from the mold.

In testimony whereof I affix my signature.

HARRY N. ATWOOD. [L. S.]